Sept. 23, 1924.  
D. C. SPENCER  
SAW GAUGE  
Filed April 7, 1923
1,509,182
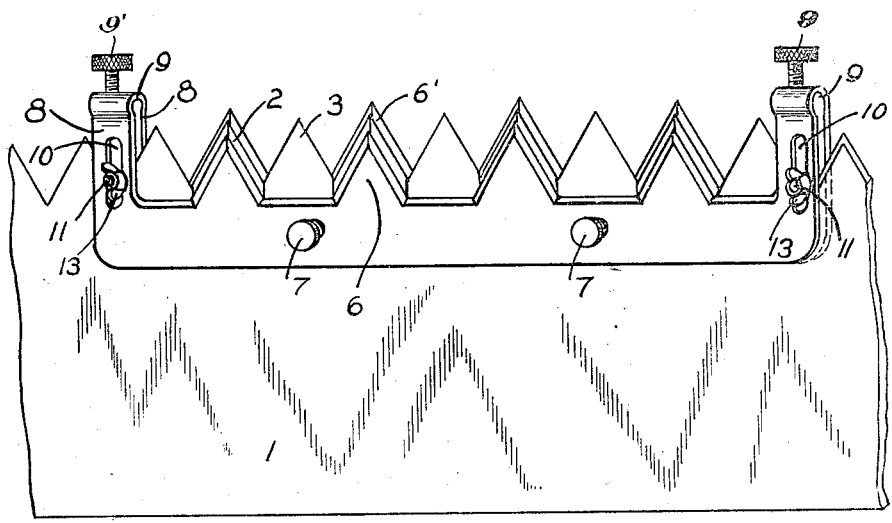
Fig. 1
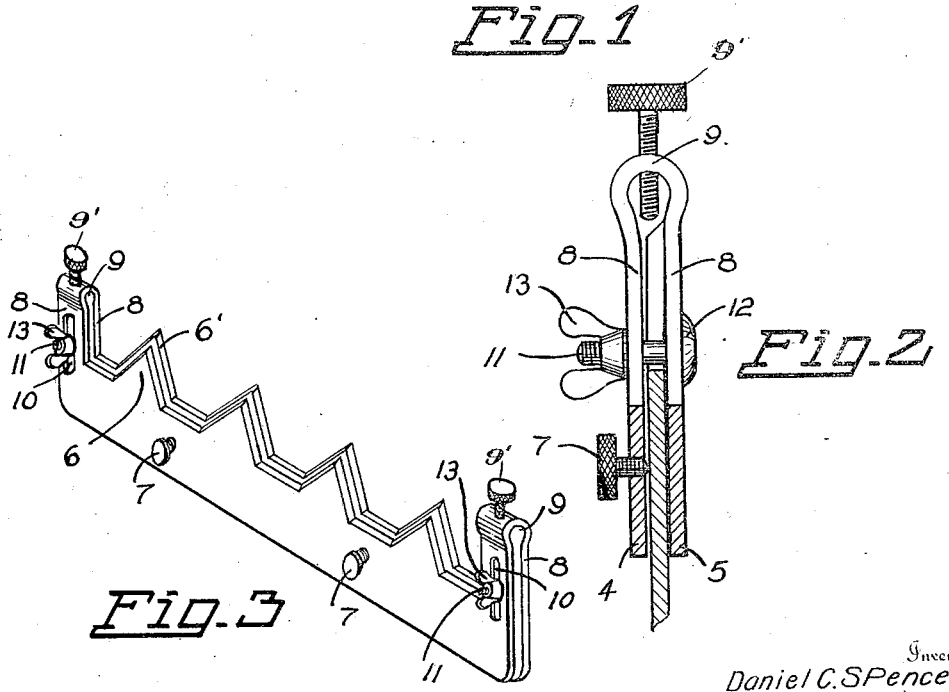
Fig. 2
Fig. 3
Inventor  
Daniel C. Spencer  
By Herbert E. Smith  
Attorney Patented Sept. 23, 1924.

1,509,182

UNITED STATES PATENT OFFICE.

DANIEL C. SPENCER, OF ST. MARIES, IDAHO.

SAW GAUGE.

Application filed April 7, 1923. Serial No. 630,587.

*To all whom it may concern:*

Be it known that I, DANIEL C. SPENCER, a citizen of the Dominion of Canada, subject of King of Great Britain, residing at St. Maries, in Kootenai County and State of Idaho, have invented certain new and useful Improvements in Saw Gauges, of which the following is a specification.

My present invention relates to improvements in saw gauges and involves an implement designed as a hand tool for use with a file when truing the teeth of saws, as for instance, in sharpening the teeth and in making them of uniform length throughout the length of the saw.

The implement is especially designed for use by saw filers when sharpening cross cut saws as used by woodsmen. For convenience and facility in sawing operations in the woods, it is a well known necessary condition that the original curvature of the toothed edge of the cross cut saw be maintained.

As the saw is usually subjected to maximum wear along its central portion of the cutting edge, the teeth at this portion of the saw become worn and consequently are shortened. It now becomes necessary that the worn teeth be lengthened by cutting, as with a file, deeper into the blade of the saw, and it is also necessary that the curvature at the edge of the teeth be restored throughout the length of the saw, to insure effective and facile operation of the saw. These results are accomplished with a file, and the operations of the file are guided by means of the device or gauge of my invention, as will be hereinafter pointed out and claimed.

In the accompanying drawings I have illustrated one complete example of the physical embodiment of my invention wherein the parts are combined and arranged according to one mode I have devised for the practical application of the principles of my invention.

Figure 1 is a view in perspective showing the gauge applied to a saw and in operative position.

Figure 2 is an enlarged, transverse sectional view, showing the gauge clamped to a saw.

Figure 3 is a perspective view of the gauge detached.

The saw 1 is or may be of the usual cross cut type, and the alternating blades 2 and 3 are set in usual manner.

The gauge is designed to be attached or clamped to the saw blade and co-acts with the teeth of the saw, as will be described. In the preferred form of the invention as shown in the drawings the gauge is composed of a pair of parallel plates 4 and 5, of hard metal, and the blades or plates are spaced apart in order that they may be slipped over the toothed edge of the saw blade. Each plate of the gauge is fashioned with teeth at its upper edge, as indicated at 6 and 6', and it will be noted that these teeth, in parallel pairs are spaced apart longitudinally of the gauge in order that the teeth of the gauge may enclose the alternating teeth of the saw, leaving the free teeth of the saw to project between the pairs of teeth on the gauge.

Set screws 7, spaced apart the required distance are used to secure the gauge to the saw blade, after the gauge has been properly set or adjusted on the toothed edge of the saw.

In one convenient form of the gauge, the plates are fashioned from a single metal blank by bending to form two pairs of parallel end plates 8, 8, with upper integral, rounded bends 9, 9 at the ends of the gauge, which insure a slight degree of resiliency between the two plates of the gauge. Each pair of upright, end-plates 8 is provided with complementary, alined slots 10, for the reception of end bolts or screws 11 which pass through the complementary slots. The bolts have large heads 12 on one end and thumb nuts 13 at the other ends of these bolts are used to clamp the bolts in adjusted position in their slots, as indicated in Figure 2, in order that an accurate adjustment can be effected. In the bends 9 are located gauge screws 9' which are adjustable with relation to the tip edges of the saw teeth. The screws 9' are used in conjunction with the screws or bolts 11 for adjusting the gauge according to the last filing. By backing off screws 9' a distance from the tips of the teeth equal to the amount of cut desired to file, and then setting both screws 9' and bolts 11, a quick and accurate adjustment is made in order that the teeth may be filed to the uniform gauge desired.

In re-sharpening the saw the gauge is slipped over the working edge of the saw as indicated in Figure 1 with the pairs of teeth of the gauge enclosing alternate teeth of the saw, as for instance the teeth set to the right. Usually and preferably the gauge is first applied to the approximate longitudinal center of the saw and the gauge is worked from the center toward one end; then the gauge is applied to the center of the saw and worked from the center toward the other end. In adjusting the gauge on the saw, the two bolts are set in the bottoms of the notches between the teeth, and the nuts 13 turned tight to hold them in rigid adjusted position, and the screws 7 are turned to clamp the gauge in position on the saw. The saw-file is then run across the edges of the saw teeth, guided by the teeth 6 6' of harder metal than the saw teeth, to give the correct angle to the saw teeth, and in addition the teeth of the gauge serve to insure the proper pitch as well as serving as gauges for the saw teeth in making them of the correct uniform length. The teeth of the gauge, being of harder metal than the teeth of the saw, will not be filed nor worn, as it will be evident to the filer as soon as the saw teeth have been filed off flush with the gauge teeth, that the saw teeth have been given the formation of the gauge teeth. As the gauge is advanced step by step toward the end of the saw, from its center, an increased cutting of the saw teeth will be required to bring all the saw teeth to uniform depth or length. After one side of the teeth have been dressed, the gauge is reversed as to its position, and the opposite side of the saw teeth is operated on.

Having thus fully described my invention, what I claim as new and desire to secure by Letters Patent is:—

A reversible saw gauge comprising a pair of spaced plates having vertical slots therein, means for attaching said gauge to a saw, said plates having at their ends integral connecting-bends, vertically arranged set screws in these ends, and transversely arranged bolts adjustable in the slots of the plates for co-action with the set screws in determining the required gauge for the saw teeth.

In testimony whereof I affix my signature.

DANIEL C. SPENCER.